United States Patent
Zinski et al.

(10) Patent No.: US 10,906,225 B2
(45) Date of Patent: Feb. 2, 2021

(54) MULTIPLE SENSOR RESIN DELIVERY METHOD FOR OPTIMIZING VACUUM PUMP OPERATION

(71) Applicants: Novatec, Inc., Baltimore, MD (US); Stephen B. Maguire, West Chester, PA (US)

(72) Inventors: James Zinski, Ellicot City, MD (US); Stephen B. Maguire, West Chester, PA (US)

(73) Assignee: Novatec, Inc., Baltimore, MD (US)

( * ) Notice: Subject to any disclaimer, the term of this patent is extended or adjusted under 35 U.S.C. 154(b) by 0 days.

(21) Appl. No.: 16/273,751

(22) Filed: Feb. 12, 2019

(65) Prior Publication Data

US 2019/0176384 A1    Jun. 13, 2019

Related U.S. Application Data (60) Division of application No. 15/840,732, filed on Dec. 13, 2017, which is a division of application No. 15/064,995, filed on Mar. 9, 2016, and a continuation-in-part of application No. 14/804,404, filed on Jul. 21, 2015, application No. 16/273,751, filed on Feb. 12, 2019, which is a continuation-in-part of application No. 15/918,161, filed on Mar. 12, 2018, and a continuation-in-part of application No. 16/146,159, filed on Sep. 28, 2018, and a
(Continued)

(51) Int. Cl.
*B65G 53/66* (2006.01)
*B29C 48/285* (2019.01)
*B29K 105/00* (2006.01)

(52) U.S. Cl.
CPC ............ *B29C 48/288* (2019.02); *B65G 53/66* (2013.01); *B29K 2105/251* (2013.01)

(58) Field of Classification Search
CPC ........ B65G 53/28; B65G 53/26; B65G 53/34; B65G 53/58; B65G 53/66
USPC ....... 406/12, 14, 28, 46, 122, 151, 152, 153, 406/156, 157, 168, 195, 198
See application file for complete search history.

(56) References Cited

U.S. PATENT DOCUMENTS

| | | |
|---|---|---|
| 1,001,510 A | 8/1911 | Curbey |
| 1,418,096 A | 5/1922 | Royer |
| 1,579,251 A | 4/1926 | Schossow |

(Continued)

FOREIGN PATENT DOCUMENTS

| | | |
|---|---|---|
| CN | 202302166 U | 7/2012 |
| DE | 3541532 A1 | 5/1986 |

(Continued)

OTHER PUBLICATIONS

Sheet of 2 photographs of Mould-Tek gravimetric blender, circa 1993.
(Continued)

*Primary Examiner* — Joseph A Dillon, Jr.
(74) *Attorney, Agent, or Firm* — Fox Rothschild LLP (57) ABSTRACT

Method for pneumatically conveying granular resin material and controlling such conveyance includes a sensor associated with granular plastic resin material receiver with the sensing vacuum level thereat and a microprocessor adjusting vacuum pump speed based on vacuum level sensed at the receiver.

4 Claims, 2 Drawing Sheets

Related U.S. Application Data continuation-in-part of application No. 16/166,004, filed on Oct. 19, 2018.

(60) Provisional application No. 62/131,935, filed on Mar. 12, 2015.

(56) References Cited

U.S. PATENT DOCUMENTS

| | | |
|---|---|---|
| 2,116,912 A | 5/1938 | Richardson |
| 2,161,190 A | 6/1939 | Paull |
| 2,351,035 A | 6/1944 | Grant, Jr. |
| 2,403,689 A | 7/1946 | Sprague |
| 2,601,654 A | 6/1952 | Wright |
| 2,655,934 A | 10/1953 | Charles |
| 2,718,435 A | 9/1955 | Hudspeth |
| 2,765,812 A | 10/1956 | Werner |
| 2,917,077 A | 12/1959 | Ziege |
| 3,111,115 A | 11/1963 | Best |
| 3,115,276 A | 12/1963 | Johanningmeier |
| 3,122,162 A | 2/1964 | Sands |
| 3,151,628 A | 10/1964 | Heckert |
| 3,164,141 A | 1/1965 | Jones |
| 3,209,898 A | 10/1965 | Beebe et al. |
| 3,239,278 A | 3/1966 | Mueller |
| 3,348,848 A | 10/1967 | Lucking et al. |
| 3,367,362 A | 2/1968 | Hoffman |
| 3,381,708 A | 5/1968 | Chenoweth |
| 3,434,493 A | 3/1969 | Owens |
| 3,468,338 A | 9/1969 | Patterson |
| 3,470,994 A | 10/1969 | Schnell et al. |
| 3,621,873 A | 11/1971 | Kenann |
| 3,667,087 A | 6/1972 | Dakin |
| 3,735,777 A | 5/1973 | Katzer et al. |
| 3,773,065 A | 11/1973 | Mattox |
| 3,773,300 A | 11/1973 | Hauser |
| 3,794,077 A | 2/1974 | Fanshier |
| 3,854,778 A | 12/1974 | Trythall |
| 3,861,830 A | 1/1975 | Johnson |
| 3,872,884 A | 3/1975 | Busdiecker |
| 3,931,953 A | 1/1976 | Allen |
| 3,951,461 A | 4/1976 | De Feudis |
| 3,959,636 A | 5/1976 | Johnson et al. |
| 3,985,262 A | 10/1976 | Nauta |
| 4,005,908 A | 2/1977 | Freeman |
| 4,026,442 A | 5/1977 | Orton |
| 4,108,334 A | 8/1978 | Moller |
| 4,148,100 A | 4/1979 | Moller |
| 4,174,731 A | 11/1979 | Sturgis |
| 4,183,467 A | 1/1980 | Sheraton |
| 4,219,136 A | 8/1980 | Williams et al. |
| 4,221,510 A | 9/1980 | Smith |
| 4,262,878 A | 4/1981 | O'ffill |
| 4,269,223 A | 5/1981 | Carter et al. |
| 4,284,261 A | 8/1981 | Benjamin |
| 4,294,020 A | 10/1981 | Evans |
| 4,342,443 A | 8/1982 | Wakeman |
| 4,354,622 A | 10/1982 | Wood |
| 4,373,838 A | 2/1983 | Foreman |
| 4,402,436 A | 9/1983 | Hellgren |
| 4,402,635 A | 9/1983 | Maruo |
| 4,454,943 A | 6/1984 | Moller |
| 4,475,672 A | 10/1984 | Whitehead |
| 4,498,783 A | 2/1985 | Rudolph |
| 4,501,518 A | 2/1985 | Smith |
| 4,508,091 A | 4/1985 | Wakeman |
| 4,511,291 A | 4/1985 | Quates, Sr. |
| 4,525,071 A | 6/1985 | Horowitz et al. |
| 4,581,704 A | 4/1986 | Mitsukawa |
| 4,586,854 A | 5/1986 | Newman |
| 4,705,083 A | 11/1987 | Rossetti |
| 4,750,273 A * | 6/1988 | Parkes .............. F26B 25/22 34/484 |
| 4,756,348 A | 7/1988 | Moller |
| 4,793,711 A | 12/1988 | Ohlson |
| 4,798,516 A | 1/1989 | Jagst |
| 4,812,086 A | 3/1989 | Kopernicky |
| 4,830,508 A | 5/1989 | Higuchi et al. |
| 4,834,385 A | 5/1989 | Jackson |
| 4,842,198 A | 6/1989 | Chang |
| 4,848,534 A | 7/1989 | Sandwell |
| 4,850,703 A | 7/1989 | Hanaoka et al. |
| 4,962,831 A | 10/1990 | Dundas |
| 4,995,422 A | 2/1991 | Chew |
| 5,011,043 A | 4/1991 | Whigham |
| 5,054,965 A | 10/1991 | Clark |
| 5,110,521 A | 5/1992 | Moller |
| 5,116,547 A | 5/1992 | Tsukahara et al. |
| 5,132,897 A | 7/1992 | Allenberg |
| 5,143,166 A | 9/1992 | Hough |
| 5,147,152 A | 9/1992 | Link |
| 5,148,943 A | 9/1992 | Moller |
| 5,172,489 A | 12/1992 | Moller |
| 5,225,210 A | 7/1993 | Shimoda |
| 5,232,314 A | 8/1993 | Hopkins |
| 5,244,179 A | 9/1993 | Wilson |
| 5,252,008 A | 10/1993 | May, III et al. |
| 5,261,743 A | 11/1993 | Moller |
| 5,285,930 A | 2/1994 | Nielsen |
| 5,340,949 A | 8/1994 | Fujimura et al. |
| 5,341,961 A | 8/1994 | Hausam |
| 5,378,089 A | 1/1995 | Law |
| 5,415,321 A | 5/1995 | Gehlert |
| 5,423,455 A | 6/1995 | Ricciardi et al. |
| 5,561,520 A * | 10/1996 | Williams .......... G01N 15/0205 356/335 |
| 5,575,309 A | 11/1996 | Connell |
| 5,575,596 A | 11/1996 | Bauer |
| 5,613,516 A | 3/1997 | Landrum |
| 5,651,401 A | 7/1997 | Cados |
| 5,669,265 A | 9/1997 | Adler |
| 5,704,391 A | 1/1998 | McGowan et al. |
| 5,767,453 A | 6/1998 | Wakou et al. |
| 5,767,455 A | 6/1998 | Mosher |
| 5,780,779 A | 7/1998 | Kitamura et al. |
| 5,791,830 A | 8/1998 | Fort |
| 5,794,789 A | 8/1998 | Payson |
| 5,843,513 A | 12/1998 | Wilke et al. |
| 6,007,236 A | 12/1999 | Maguire |
| 6,036,407 A | 3/2000 | Nester |
| 6,070,610 A | 6/2000 | Owler |
| 6,076,803 A | 6/2000 | Johnson |
| 6,085,777 A | 7/2000 | Welker |
| 6,089,794 A | 7/2000 | Maguire |
| 6,102,629 A | 8/2000 | Ishida |
| 6,152,656 A | 11/2000 | Curtis et al. |
| 6,158,363 A | 12/2000 | Memory et al. |
| 6,199,583 B1 | 3/2001 | Iacovella |
| 6,227,768 B1 | 5/2001 | Higuchi |
| 6,379,086 B1 | 4/2002 | Goth |
| 6,386,800 B1 | 5/2002 | van Eyck |
| 6,413,020 B1 | 7/2002 | Davison |
| 6,419,418 B1 | 7/2002 | Smith |
| 6,447,215 B1 | 9/2002 | Wellmar |
| 6,497,083 B1 | 12/2002 | Garwood |
| 6,585,004 B1 | 7/2003 | Porter |
| 6,588,988 B2 | 7/2003 | Zlotos |
| 6,634,375 B2 | 10/2003 | Olivas |
| 6,644,345 B2 | 11/2003 | Dulin |
| 6,648,558 B1 | 11/2003 | Shultz |
| 6,786,681 B2 | 9/2004 | Grasshoff |
| 6,827,528 B1 * | 12/2004 | Relin .................... B65G 23/00 406/106 |
| 6,834,755 B2 | 12/2004 | Jay |
| 6,871,618 B2 | 3/2005 | Masse |
| 6,890,129 B2 | 5/2005 | Fabbri |
| 6,923,601 B2 | 8/2005 | Goth |
| 6,942,133 B2 | 9/2005 | Frankeberger |
| 6,981,619 B2 | 1/2006 | Moretto |
| 7,066,689 B2 | 6/2006 | Maguire |
| 7,080,960 B2 | 7/2006 | Burnett |
| 7,114,889 B2 | 10/2006 | Kanou |
| 7,117,886 B2 | 10/2006 | Kajitani |
| 7,137,729 B2 | 11/2006 | Moretto |

(56) References Cited

U.S. PATENT DOCUMENTS

| | | | |
|---|---|---|---|
| 7,188,434 B2 | 3/2007 | Moretto | |
| 7,191,807 B2 | 3/2007 | DeMaison | |
| 7,192,222 B2 | 3/2007 | Van Mullekom | |
| 7,231,927 B2 | 6/2007 | Suehara | |
| 7,311,474 B1 | 12/2007 | Ogasahara | |
| 7,318,459 B2 | 1/2008 | Frankeberger | |
| 7,384,018 B2 | 6/2008 | Moretto | |
| 7,472,494 B2 | 1/2009 | Moretto | |
| 7,503,128 B2 | 3/2009 | Moretto | |
| 7,662,211 B2 | 2/2010 | Federico | |
| 7,766,037 B2 | 8/2010 | Moenkhaus | |
| 7,766,305 B2 | 8/2010 | Kim | |
| 8,012,313 B2* | 9/2011 | Carson | B01D 1/18 |
| | | | 203/48 |
| 8,021,462 B2 | 9/2011 | Moretto | |
| D650,888 S | 12/2011 | Moretto | |
| 8,070,844 B2 | 12/2011 | Maguire | |
| 8,092,070 B2 | 1/2012 | Maguire | |
| 8,113,745 B2 | 2/2012 | Aoki | |
| D671,563 S | 11/2012 | Moretto | |
| D671,564 S | 11/2012 | Moretto | |
| 8,322,951 B2 | 12/2012 | Kvalheim | |
| 8,360,691 B2 | 1/2013 | Moretto | |
| 8,408,228 B1 | 4/2013 | Jimenez | |
| 8,412,383 B2 | 4/2013 | Moretto | |
| D688,711 S | 8/2013 | Moretto | |
| 8,573,896 B2* | 11/2013 | Relin | F04B 35/04 |
| | | | 406/10 |
| 8,672,194 B2 | 3/2014 | Moretto | |
| 8,753,432 B2 | 6/2014 | Maguire | |
| 8,763,273 B2 | 7/2014 | Moretto | |
| 8,793,900 B2 | 8/2014 | Moretto | |
| 8,794,259 B2 | 8/2014 | Daneshgari | |
| D718,791 S | 12/2014 | Moretto | |
| 8,905,681 B2 | 12/2014 | Schneider | |
| 8,914,990 B2 | 12/2014 | Moretto | |
| 9,181,044 B1 | 11/2015 | Baker | |
| 9,365,367 B2 | 6/2016 | Kraemer | |
| 9,371,198 B2 | 6/2016 | Maguire | |
| 9,459,183 B1 | 10/2016 | Schnakenberg | |
| 9,550,635 B2 | 1/2017 | Maguire | |
| 9,550,636 B2 | 1/2017 | Maguire | |
| 9,561,915 B2 | 2/2017 | Kelly | |
| 9,604,793 B2 | 3/2017 | Maguire | |
| 9,637,320 B2 | 5/2017 | Moretto | |
| 9,663,263 B2 | 5/2017 | Moretto | |
| 9,731,914 B2 | 8/2017 | Rasner | |
| 10,227,186 B2* | 3/2019 | De Jager | A24C 5/392 |
| 2002/0061232 A1 | 5/2002 | Zlotos | |
| 2002/0136609 A1 | 9/2002 | Maguire | |
| 2003/0168618 A1 | 9/2003 | Coney | |
| 2004/0115013 A1 | 6/2004 | Goth | |
| 2004/0221893 A1 | 11/2004 | Johnson | |
| 2005/0012058 A1 | 1/2005 | Medina | |
| 2005/0039816 A1 | 2/2005 | Maguire | |
| 2005/0089378 A1 | 4/2005 | Gerber | |
| 2005/0265793 A1 | 12/2005 | Van Mullekom | |
| 2008/0314461 A1 | 12/2008 | Moretto | |
| 2009/0031580 A1 | 2/2009 | Moretto | |
| 2009/0039106 A1 | 2/2009 | Moretto | |
| 2009/0090018 A1 | 4/2009 | Moretto | |
| 2009/0151800 A1 | 6/2009 | Salmento | |
| 2009/0295016 A1 | 12/2009 | Shinohara | |
| 2010/0080677 A1* | 4/2010 | Heinzen | B65G 53/24 |
| | | | 414/298 |
| 2011/0097159 A1 | 4/2011 | Haberl | |
| 2011/0211919 A1 | 9/2011 | Rasner | |
| 2011/0299943 A1 | 12/2011 | Woolever | |
| 2012/0189413 A1* | 7/2012 | Richiger | A01F 25/20 |
| | | | 414/310 |
| 2012/0201917 A1 | 8/2012 | Shinohara | |
| 2012/0230779 A1 | 9/2012 | Dunstan | |
| 2012/0264200 A1* | 10/2012 | Hedrick | A61B 17/00 |
| | | | 435/283.1 |
| 2013/0202370 A1 | 8/2013 | Moretto | |
| 2013/0209180 A1 | 8/2013 | Moretto | |
| 2015/0175282 A1 | 6/2015 | Thompson | |
| 2015/0232287 A1 | 8/2015 | Maguire | |
| 2015/0232288 A1* | 8/2015 | De Jager | A24C 5/392 |
| | | | 406/12 |
| 2015/0232289 A1 | 8/2015 | Maguire | |
| 2015/0232290 A1 | 8/2015 | Maguire | |
| 2015/0308584 A1 | 10/2015 | Ehrne | |
| 2015/0321860 A1 | 11/2015 | Maguire | |
| 2016/0039553 A1 | 2/2016 | Akdogan | |
| 2016/0096693 A1 | 4/2016 | Hanaoka | |
| 2016/0106027 A1 | 4/2016 | Wilhelmi | |
| 2016/0158967 A1 | 6/2016 | Maguire | |
| 2016/0167897 A1 | 6/2016 | Wiemers | |
| 2016/0231754 A1* | 8/2016 | Kristoffersen | E21B 21/062 |
| 2016/0244275 A1 | 8/2016 | Maguire | |
| 2016/0272439 A1 | 9/2016 | Kelly | |
| 2016/0280473 A1 | 9/2016 | Veselov | |
| 2016/0292953 A1 | 10/2016 | Brown | |
| 2016/0347557 A1 | 12/2016 | Tell | |
| 2017/0174447 A1 | 6/2017 | Baker | |
| 2017/0320681 A1* | 11/2017 | Brewster | B65G 53/66 |
| 2018/0281034 A1* | 10/2018 | Lavallee | B09B 5/00 |

FOREIGN PATENT DOCUMENTS

| | | |
|---|---|---|
| DE | 3923241 | 1/1991 |
| DE | 4323295 | 2/1995 |
| EP | 0318170 | 5/1989 |
| EP | 0507689 | 10/1992 |
| EP | 0587085 | 9/1994 |
| EP | 0743149 | 11/1996 |
| FR | 2109840 | 5/1972 |
| FR | 2235775 | 1/1975 |
| FR | 2517087 | 5/1983 |
| GB | 203758 A | 9/1923 |
| GB | 271930 A | 6/1927 |
| GB | 2081687 | 2/1982 |
| JP | 1235604 | 9/1989 |
| JP | 4201522 | 7/1992 |
| JP | 6114834 | 4/1994 |

OTHER PUBLICATIONS

Sheet of 2 photographs of Motan gravimetric blender and feeding system with Maguire Products, Inc. controls, circa 1993.

Sheet of 3 photographs of UNA-DYN gravimetric blender, circa 1993.

Sheet of 2 photographs of Maguire Products, Inc. gravimetric blender with Conair hoppers and feeding system, circa 1993.

Sheet of 1 photograph of Hydracolor gravimetric blender, circa 1993.

Advertisement entitled "Machinery and Systems for Extrusion is Our Only Business" by Process Control Corporation, circa 1993.

Advertisement entitled "Weigh Blender Delivers Unmatched Accuracy" by Universal Dynamics, Inc., circa 1993.

Advertisement entitled "A Full Line-up of Blender Solutions . . . Priced Right" by HydReclaim, circla 1993.

Advertisement entitled "New From HydReclaim—Now Processors Can Economically Achieve Continuous Gravimetric Blending" by HydReclaim, circa 1993.

Article entitled "Control Loading Systems" from Plastics Technology, Oct. 1995, p. 41.

Advertisement "Introducing our 400 VME-II Gravimetric Blender" by HydReclaim Corporation, circa 1993.

Four page brochure entitled "Gravimix Better Quality through Research", circa 1993.

Four page brochure entitled "Conomix Plus Volumetric Blender" dated Aug. 1993.

Four page brochure entitled "Conair Franklin Autocolor Y Mezclador" dated Mar. 1995.

Two-sided flyer entitled "GB 140 Series Compact Auto Weigh Blender" published by Conair Franklin in the United States, Jun. 1994.

(56) References Cited

OTHER PUBLICATIONS

Six page brochure entitled "Graviblend Precise Continuous Weigh Blenders" published by Ktron Vertech, Jun. 1991, United States.
Six page brochure entitled "Piovan Gravimetric Blenders MDW" published by Piovan Sri, Oct. 1993, Venezia, Italy.
One page two-sided flyer entitled "Gravimix, The New Gravimetric Blending Generation" published by Ferlin, De demsvaard, Holland, circa 1993.
Four page brochure entitled "When you Weigh it All Up . . . " published by Ferlin Trading, Holland, circa 1993.
Thirty-two page catalog entitled "Maguire Color Blending Equipment" published by Maguire Products, Inc., 1993, United States.
Two page brochure entitled "Mould-Tek Bulk Handling Systems" published by Mould-Tek Industries, Inc. in Canada, circa 1993.
Brochure entitled "Plastic Molders and Extruders: published by Maguire Products, Inc., 1995".
Five page brochure entitled "Blending power: GXB Blender The Better Alternative" of Mould-Tek, circa 1998.
Forty-four page two-sided brochure including cover and back pages entitled "Maguire: Auxiliary equipment for the plastics industry" of Maguire Products, Inc., Oct. 2000.
Two-sided color brochure entitled "Convey, Blend, Dry" published by Novatec, Inc., undated.
Three page two-sided color brochure entitled "Accuracy, flexibility and performance are at your fingertips with ConveyPacer III Series "S" Controller" of Mould-tek, 1999.
Seven page two-sided color brochure plus cover entitled "Exac-U-Batch Series Weigh Scale Blenders: Engineered to be the ultimate blend of precision and control!" of Mould-tek, 2000.
Three page two-sided color brochure entitled "We have the building blocks to integrate your entire plastics bulk handling system." of Mould-tek, 1999.
Two page two-sided color brochure entitled "Model GXB-2202 Exac-U-Batch Gravimetric Scale Blender: Accurate weigh scale blending under precise computer control" of Mould-tek, 2000.
One page, two-sided color brochure entitled "Bulk handling power: the manufacturer of the world's most advanced blender gives you the same performance in bulk handling systems" of Mould-Tek, dated Apr. 1999.
Three page two-sided color brochure entitled "Portable Drying and Conveying Systems: Nomad™ Series Portable Dryers", AEC Whitlock, 1998.
Two page two-sided color brochure entitled "Drying Systems: WD Series Dehumidifying Dryers" of AEC Whitlock, 1997.
19 page document entitled "Model MLS—Clear Vu Eight Component Vacuum Loading System: Operation Manual" of Maguire Products, Inc. dated May 4, 1999.
One page two-sided color brochure entitled "Maguire Clear-Vu™ Loading System" of Maguire Products, Inc.
Four page two-sided color brochure entitled "Novatec Inc. Vacuum Loaders—Electro-Polished Stainless Steel Finish" of Novatec Inc., undated*.
Eight page two-sided color brochure entitled "Novatec Inc. Material Conveying Solutions for the Plastics Industry", 1999.
Two page two-sided color brochure entitled Maguire Model MPM Pre-Mixers of Maguire Products, Inc., Apr. 1997.
Two page two-sided color brochure entitled "WDMR Series Compact Dryers" of AEC Whitlock, 1998.
Two page two-sided color reprint entitled "10 most frequently asked questions about Dryers" by Joseph Dziediz, AEC/Whitlock, from Plastics Technology, Jan. 1998.
Two page two-sided color brochure entitled "Drying Systems: WD Series High Capacity Dehumidifying Dryers" of AEC Whitlock, 1997.
Five page two-sided color brochure entitled "AEC Auxiliaries As Primary", AEC, Inc., 1999.
AEC Whitlock Operation and Installation Manual for VacTrac™ Series Conveying Systems, Single-Station Controllers, Oct. 30, 1997.
Whitlock Turbo-Vac™ Vacuum Power Units Installation,k Operation and Maintenance Manual, 1984.
AEC Whitlock Operation & Installation Manual—Continuous Vacuum/Pressure Conveying Systems, Single- and Dual-Blower Systems, Apr. 28, 1998.
AEC Whitlock Operation and Installation Manual WD Series WD350 to WD3000 Dehumidifying Dryers with Fuzzy Logic Controls, Oct. 11, 1995.
AEC Whitlock Operation and Installation Manual Nomad Series PD-2 to PD-4 Drying and Conveying Systems, Apr. 11, 1997.
AEC Whitlock HE—CHE—BCHE Mass Flow Series Dying Hoppers, Dec. 17, 1997.
Written Opinion for PCT Application No. PCT/US2016/12411, dated Mar. 2, 2016.
International Search Report for PCT Application No. PCT/US2016/12411, dated Mar. 2, 2016.
Written Opinion for PCT Application No. PCT/US2016/19455, dated May 13, 2016.
International Search Report for PCT Application No. PCT/US2016/19455, dated May 13, 2016.
Introduction to Pneumatic Conveying of Solids, Karl Jacob, The Dow Chemical Company, originally delivered on Sep. 8, 2010.

* cited by examiner

MULTIPLE SENSOR RESIN DELIVERY METHOD FOR OPTIMIZING VACUUM PUMP OPERATION

CROSS REFERENCE TO RELATED PATENTS AND PATENT APPLICATIONS

This patent application is a 35 USC 121 division of U.S. patent application Ser. No. 15/840,732, entitled "Multiple Sensor Resin Delivery Optimizing Vacuum Pump Operation", filed 13 Dec. 2017 in the names of James Zinski and Stephen B. Maguire, published 12 Apr. 2018 as US 2018/0099499-A1. This application claims the priority of the '732 application under 35 USC 120.

The '732 patent application is a division of U.S. patent application Ser. No. 15/064,995, entitled "Resin Delivery Method and Apparatus Using Multiple Sensors for Optimal Vacuum Pump Operation", filed 9 Mar. 2016 in the names of James Zinski and Stephen B. Maguire, published 30 Jun. 2016 as US 2016/0185537-A1. This application claims the priority '995 application directly and through the '732 application under 35 USC 120.

The '732 patent application is also a continuation-in-part of U.S. patent application Ser. No. 14/804,404, entitled "Vacuum Powered Resin Loading System Without Central Control", filed 21 Jul. 2015 in the name of Stephen B. Maguire, published 12 Nov. 2015 as US 2015/0321860-A1). This application claims the priority of the '404 application directly and through the '732 application under 35 USC 120.

This patent application is also a continuation-in-part of U.S. patent application Ser. No. 15/918,161, entitled "Vacuum Powered Self-Controlled Loading and Conveying Granular Material", filed 12 Mar. 2018 in the name of Stephen B. Maguire. This application claims the priority of the '161 application under 35 USC 120.

This patent application is also a continuation-in-part of U.S. patent application Ser. No. 16/146,159 entitled "Air Flow Regulation in Granular Material Delivery System", filed 28 Sep. 2018 in the name of Stephen B. Maguire. This application claims the priority of the '159 application under 35 USC 120.

This patent application is also a continuation-in-part of U.S. patent application Ser. No. 16/166,004, entitled "Apparatus and Method for Heated Air Flow Control in Granular Material Drying", filed 19 Oct. 2018 in the name of Stephen B. Maguire. This application claims the priority of the '064 application under 35 USC 120.

This patent application also claims the benefit of the priority of U.S. provisional application Ser. No. 62/131,935 entitled "Resin Delivery Method and Apparatus Using Multiple Sensors for Optimal Vacuum Pump Operation", filed 12 Mar. 2015 in the name of James Zinski. The priority of the '935 application is claimed through the '995 application under 35 USC 120.

STATEMENT REGARDING FEDERALLY SPONSORED RESEARCH OR DEVELOPMENT

Not applicable—this invention was conceived and developed entirely using private source funding; this patent application is being filed and paid for entirely by private source funding.

INCORPORATION BY REFERENCE

Applicant hereby incorporates by reference all of the patents and published patent applications identified in the "Cross-Reference to Related Patents and Patent Applications" section above.

BACKGROUND OF THE INVENTION

This invention relates to manufacture of plastic articles and more particularly relates to pneumatic conveyance and processing of plastic resin pellets prior to molding or extrusion of those pellets into a finished or semi-finished plastic product.

In this patent application, injection and compression molding presses and extruders are collectively referred to as "process machines."

The plastics industry is very diversified; there are thousands of different products, hundreds of materials, and dozens of processes, and all are very different from one another. The only thing all these share in common is that the source material is some type of plastic.

Equipment sold to this industry is, therefore, very diversified in design. Plastics factories have multiple process machines, sometimes several hundred in one location. Virtually all plastics fabricating operations require that each process machine, namely a molding press or an extruder, be supplied automatically with the required raw resin material on a continuous basis. This resin may be supplied in large boxes called "Gaylords", in fiber drums, in 50 pound bags, or more typically may be delivered by bulk truck or rail car, with the resin material then being transferred in bulk into storage silos. In all cases the resin material must be further distributed throughout the plant to the process machines. For that reason a great deal of design and capital expense is devoted to the automatic distribution of the raw resin material throughout the plant.

These resin distribution systems, more commonly referred to as "Loading Systems", must deal with many variables. One set of variables includes the type, shape, size and consistency of the granular material.

Resin pellets, nominally about ⅛ inch in size, come in various shapes, with round, square, and cylindrical being the most common.

Flowing resin powder is also an option, and very fine but free flowing resin pellets and other granular materials may be conveyed as well.

The design variables to be considered for each customer include:
1. Type of resin being conveyed.
2. Size and consistency of the resin pellets.
3. Distances the resin pellets are to be conveyed.
4. Variability of these distances from shortest to longest.
5. Acceptable range for velocity of resin material travel through the lines.
6. Throughput rate of resin required for each machine.
7. Total throughput rate of resin for the entire plant.
8. Excess capacity performance margin so a molding or extrusion process is not interrupted by short term loading issues.
9. Loss of resin material from or at the supply so that only air is being pulled, thereby reducing system vacuum levels and reducing overall design throughput.
10. Loading sequence, or priority, when multiple receiver stations call for material.
11. Detecting problems and alarm conditions.
12. Proper air to material ratio for resin conveying.

13. Detecting plugged lines due to poor resin flow or over feeding of resin material.
14. Dust condition and filter requirements.
15. Reliability.
16. Serviceability.
17. Ease of use.
18. Cost
19. Vacuum pump type, namely positive displacement, regenerative, and others.
20. Vacuum pump horsepower and rated CFM capacity as well as vacuum levels.

In all of these areas, system designers look to find improved methods and solutions whenever possible.

One of the most important considerations is to hold a correct velocity during conveyance for the conveyed resin material. The type of resin material dictates the target conveying speed. To maximize the resin material transfer rate, a high conveying speed is preferred, and air speed in any case must be sufficient to keep the resin pellets suspended and moving in the air stream. But velocity must be limited so as not to damage the pellets. Hard brittle pellets can fracture and break when conveyed, resulting in excessive dust.

Softer pellets can skid along the conduit walls, causing "angel hair" as a result of the plastic resin melting at the point of high speed contact with the conduit wall; this leaves a thin film on the wall. Strings of very thin "angel hair" accumulate, effectively reducing diameter of the conduit and causing problems in the system.

Air speed and resin conveying velocity are directly related to pump capacity (rated in Cubic Feet per Minute, abbreviated as "CFM") and horsepower, as well as conveying line diameter. There is always a correct velocity "range" for each type of resin material. It is a design challenge to assure that the resin material is conveyed within the correct velocity range.

Conveying distances affect system design. Conveying over short distances requires a less powerful vacuum source then over longer distances. Systems are generally sized to produce the best compromise for material velocity between the shortest and longest conveying distance.

Required conveying rate usually dictates line size (conduit diameter), and this in turn dictates the CFM required to maintain correct velocity in a given diameter conduit. This means different conduit sizes in the same system can be a problem if one vacuum pump is to draw air and resin through several different diameter conveying lines. Pumps have known CFM ratings. Pulling air through a small conduit will result in higher velocity flow than pulling the same CFM through a larger conduit.

Excessive velocity can damage pellets.

The type of vacuum pump to be selected is important. Regenerative blowers deliver wide ranging CFM depending on vacuum level. Positive displacement type pumps deliver high vacuum levels, and have a flatter CFM curve over their vacuum range. Regenerative blowers are quieter and generally cost less. Positive displacement blowers may require sound enclosures and tend to cost more, but are generally more reliable and more forgiving as respecting dust in the air.

The simplest systems use a fixed speed motor to drive the vacuum pump, and a single size conveying line to serve all receivers regardless of conveying distance, conveying rate requirement, or the material being conveyed.

VFD (Variable Frequency Drive) motors allow vacuum pumps to operate at different speeds, and therefore at different CFM rates, with the vacuum pump pulling different vacuum levels depending on preset information about each receiver being served.

The addition of a SCFM (Standard Cubic Feet per Minute) regulator in the air flow line allows oversized vacuum pumps to be used without risk of conveying at excessive velocity. SCFM regulators restrict air flow to a preset SCFM. This maintains the desired SCFM air flow at the inlet, which is critical for proper conveying in a given size conveying line.

DESCRIPTION OF THE PRIOR ART

Current resin central loading systems concerned with conveying granular plastic resin pellets from a storage area for molding or extrusion typically include a vacuum pump or pumps and multiple receivers.

In some systems, with many receivers, several small pumps are used.

It would be less expensive to use only one, or fewer, larger pumps. However, a larger pump may draw too much air with resulting damage to the material being conveyed. While a larger pump could load several receivers at once, there is a risk that an "open" line, namely a line pulling only air, and no resin material, would cause the vacuum to drop too much, and no resin would load. Also, when only one receiver is loading resin, air velocity might be too high, again with a risk of damaging the resin.

Nevertheless, in facilities that fabricate plastic products by molding or extrusion, it is common to use such vacuum loading systems to pneumatically convey pellets of thermoplastic resin, prior to molding or extrusion of those pellets into a finished or semi-finished product. The plastic resin pellets are typically purchased in 50 pound bags, 200 pound drums, or 1,000 pound containers commonly referred to as "Gaylords."

A common approach for conveying plastic resin pellets from a storage location to a process machine, which approach is often used in larger facilities, is to install a central vacuum pump or even several vacuum pumps, connected by common vacuum lines to multiple "receivers."

Vacuum pumps connected to the vacuum lines draw vacuum, namely air at pressure slightly below atmospheric, as the vacuum pump sucks air through the "vacuum" line. The suction moves large quantities of air which carries thermoplastic resin pellets through the "vacuum" line.

An alternative is to use positive pressure produced by a blower or the exhaust from a vacuum pump. With such an approach, the positive pressure results in a movement of substantial amounts of air which may be used to carry the plastic resin pellets. However, the vacuum approach of drawing or sucking or pulling pellets through the system conduit(s) is preferable to the positive pressure approach of pushing the resin pellets through the system conduit(s).

In practice, vacuum pumps are preferred and vacuum lines are desirable in part because power requirements to create the required vacuum necessary to draw plastic resin pellets through the lines are lower than the power requirements if the plastic resin pellets are pushed through the lines by a blower or by the exhaust side of a vacuum pump. When vacuum is used, the static pressure within the line may be not much less than atmospheric. When positive pressure is used, the dynamic pressure of the air flowing through the line must be relatively high in order to move an adequate quantity of plastic resin pellets.

As used herein, and in light of the foregoing explanation, the terms "vacuum pump" and "blower" are used interchangeably.

When one or more central vacuum pumps are connected to multiple receivers, a receiver is typically located over each temporary storage hopper, in which the plastic resin pellets are temporarily stored before being molded or extruded. A temporary storage hopper is typically associated with each process machine.

In current practice, the receiver is connected by a control wire to a central control system. The control system works by selectively opening a vacuum valve located in each receiver, allowing one or several vacuum pumps to work in sequence drawing "vacuum", i.e. below atmospheric pressure air, to carry the pellets among and to multiple receivers as individual ones of the receivers, positioned over individual hoppers associated with individual process machines, require additional plastic resin pellets. The receiver for a given hopper-process machine combination is actuated by opening the vacuum valve located in or near the receiver, causing the receiver to supply plastic resin pellets by gravity feed into the hopper from where the pellets may be fed further by gravity downwardly into the associated process machine.

Large, high capacity industrial vacuum pumps are reliable and are suited to heavy duty industrial use. Large, high capacity vacuum pumps allow long conveying distances for the plastic resin pellets. Currently available large capacity vacuum pumps permit plastic resin pellets to be conveyed over distances of 200 feet or more using vacuum drawn by the pump. Use of such high capacity vacuum pumps results in a big rush of below atmospheric pressure air through the line, carrying the plastic resin pellets over a long distance. The vacuum pump speed is not modulated; the vacuum pump is either "on" or "off." As a result, when the pump is operating, "vacuum", more accurately "air", is drawn at a fixed rate by the vacuum pump through the system.

Operators of plastic manufacturing facilities prefer to buy plastic resin pellets in bulk, in rail cars or tanker trucks. Bulk purchases result in cost savings. Plastic resin pellets delivered in bulk are typically pumped into large silos for storage. In a large manufacturing facility, the distance from a plastic resin pellet storage silo to a process machine may be several hundred feet, or more. Accordingly, when plastic resin pellets are purchased in bulk, a central vacuum-powered conveying system, powered by one or more large, high capacity industrial vacuum pumps, is a necessity.

Typically, large central plastic resin pellet conveying systems have one or more vacuum pumps, each typically being from 5 to 20 horsepower. These central systems include central controls connected by wire to each receiver associated with each process machine in the facility. Typically eight, sixteen, thirty-two or sixty-four receivers, each associated with a process machine, may be connected to and served by the central plastic resin pellet vacuum conveying system. Of course, the higher the number of receivers served by the system, the higher the cost. The central control is connected by wire to each receiver and is used to signal when a receiver is empty and therefore needs and should receive granular resin material. The central control, wired to each receiver, does not measure vacuum level at the receiver and is not in any way used to moderate or modulate operation of the vacuum pump.

A factor to be considered in designing such a system is the speed of the plastic resin pellets as they flow through a conduit as the plastic resin pellets are carried by the moving air stream drawn by the vacuum pump. If air flow is too slow, the plastic resin pellets fall out of the air stream and lie on the bottom of the conduit, with resulting risk of clogging the conduit. If air flow is too fast, the plastic resin pellets can skid along the conduit surface. In such case, harder, more brittle plastic resin pellets may be damaged, resulting in dust within the conduit, which when drawn into the vacuum pump can damage the vacuum pump and render the system inoperative. Softer plastic resin pellets heat up and can melt from friction when contacting the conduit interior surface. This results in "angel hair"—long, wispy-thin strands of plastic film which eventually clog the conduit and cause the system to shut down.

For these reasons, pneumatic plastic resin pellet conveying systems must be designed to produce desired, reasonable conveying speeds for the plastic resin pellets.

Currently, conveying speed of the plastic resin pellets is most often controlled by controlling air flow, measured in cubic feet per minute, and varying the desired and designed cubic feet per minute based on conduit diameter, with a larger diameter conduit requiring more cubic feet per minute of air flow to maintain proper air flow speed through the conduit. Controlling air flow, measured in cubic feet per minute, is conventionally done by specifying the vacuum pump capacity; vacuum pump speed modulation is not within the state of the art.

Controlling cubic feet per minute of air flow is an indirect way of controlling plastic resin pellet speed as the plastic resin pellets flow through a conduit of a given diameter. Typically, a 2 inch diameter conduit requires about 60 cubic feet per minute of air flow to convey typical plastic resin pellets. A 2½ inch diameter conduit typically requires about 100 cubic feet per minute of air flow to convey typical plastic resin pellets. To achieve these desired air flow volume flow rates, a designer must carefully match the horsepower of a vacuum pump, which has a given cubic feet of air per minute rating, to a selected size conduit, taking into consideration the average distance the plastic resin pellets must be conveyed through the conduit from a storage silo to a receiver or loader (because resin conveyance systems are not designed for modulation of vacuum pump speed for the reason noted above—vacuum pump speed modulation is not within the state of the art). If this results in selection of a 5 horsepower blower/vacuum pump, then a given facility may require several such blowers/vacuum pumps, with each blower/vacuum pump supplying only a selected number of receivers.

A single plastic resin molding or extruding facility might theoretically require a 20 horsepower blower and the corresponding cubic feet per minute capability for conveyance provided by the single blower to meet the total conveying requirements for plastic resin pellets throughout the facility. However, a single twenty horsepower blower would result in far too high a conveying speed for the plastic resin pellets through any reasonable size conduit. As a result, the conveying system for the plastic resin pellets in a large facility is necessarily divided and powered by three or four smaller blowers, resulting in three or four different, separate systems for conveyance of plastic resin pellets. Sometimes several blowers are connected to a single set of receivers, with one or more of the extra blowers turning "on" only when required to furnish the required extra cubic feet per minute of air flow. This is controlled by a central station monitoring all receivers and all blowers, with the central station being programmed to maintain all of the hoppers associated with the process machines in a full condition, wherever those hoppers are located throughout the facility.

Even with careful planning and design, results achieved by such pneumatic plastic resin pellet conveying systems are not consistent. Air flow speed and cubic feet per minute capacity of blowers often vary and are outside of selected design and specification values.

INCORPORATION BY REFERENCE

In addition to the patents and published patent applications listed above under the heading "Cross Reference to Related Patents and Patent Applications," the disclosure of U.S. Pat. No. 8,753,432 is also incorporated herein by reference.

SUMMARY OF THE INVENTION

The inventive technology offers controls and devices that can maximize performance for the variety of conditions that actually exist in a plant.

In one of its aspects, this invention provides apparatus for pneumatically conveying granular plastic resin material where the apparatus includes a resin supply, a vacuum pump having a suction intake, and a plurality of receivers for temporarily storing resin material until needed by an associated process machine. A conduit conveys granular resin material from the resin supply to the receivers in response to vacuum drawn through the conduit by the vacuum pump. One or more sensors associated with one or more of the receivers sense vacuum level at the receiver. A sensor at the vacuum pump suction intake senses vacuum level thereat. The method further embraces adjusting vacuum pump speed based on vacuum levels sensed optimally and optionally at the receivers and at the vacuum pump. Desirably, at least one sensor is associated with each receiver so that vacuum pump speed can be adjusted based on vacuum level sensed at all of the receivers, and desirably at the vacuum pump as well, thereby providing optimum conditions for a pneumatic transport of the granular plastic resin material from the supply to the receivers.

In still another one of its aspects, this invention provides a method for pneumatically conveying plastic resin material from a resin supply using a resin pump having a suction intake where the method includes providing a plurality of receivers for temporarily storing resin material until needed by an associated process machine. The method further proceeds with providing a conduit for conveying granular resin material from the resin supply to the receivers in response to vacuum drawn through the conduit by a vacuum pump. The method yet further proceeds by periodically sensing vacuum level at each receiver, storing the sensed vacuum levels, actuating the vacuum pump and adjusting vacuum pump speed based on the stored vacuum levels.

Desirably the sensed vacuum levels are sensed serially at the receivers. The method may further embrace adjusting the pump speed based on multiple collections of serially sensed vacuum levels. The method may yet further embrace periodically sensing vacuum level at the vacuum pump, which vacuum level may be sensed serially. The method then further embraces adjusting the pump speed based on multiple collections of serially sensed vacuum levels including vacuum level at the vacuum pump.

In another one of its aspects, this invention provides a method for conveying granular plastic resin material from a supply thereof to at least one receiver, for temporary storage of the granular plastic resin material in the receiver until the material is needed by a process machine associated with the receiver, where the method includes positioning a first conduit with an open end in the supply of granular plastic resin material. The method proceeds by drawing vacuum through the first conduit, thereby conveying granular plastic resin material out of the supply and along the conduit. The method then provides a receiver connected to the conduit for receipt of granular resin material from the conduit. Next, a second conduit is provided, connecting the receiver to a source of the drawn vacuum, which draws vacuum through the first conduit via the receiver. Next, the invention proceeds by providing at least one vacuum sensor in the first conduit and regulates vacuum drawing according to sensed vacuum level at the vacuum sensor.

In this aspect of the invention, the method may further provide a second vacuum sensor in the second conduit and regulate vacuum draw according to vacuum levels sensed at the two vacuum sensors.

In this aspect of the invention, the method may yet further involve providing a vacuum sensor at the receiver and regulating vacuum draw according to vacuum levels sensed at the three vacuum sensors, one sensor at the receiver, one sensor in the second conduit, and one sensor in the first conduit.

In this one of its aspects, the invention further provides a method for conveying granular plastic resin material from a supply thereof to at least one receiver as noted in the three preceding paragraphs, where the method further includes regulating vacuum draw according to an algorithm executed by a computing device based on input signals received from the vacuum sensors.

In still yet another one of its aspects, this invention provides a method for conveying granular plastic resin material from a supply thereof to at least one receiver for temporary storage of granular plastic resin material in the receiver until the material is needed by a process machine associated with the receiver. In this aspect of the invention, the method commences with positioning a first conduit with an open end in the resin supply. The method proceeds by drawing vacuum through the first conduit, thereby conveying granular plastic resin material out of the supply and along the conduit. The method yet further proceeds by providing a receiver connected with the conduit for receipt of granular resin material from the conduit. A second conduit is provided connecting the receiver to the vacuum source providing the drawn vacuum via the receiver to the first conduit. At least one vacuum sensor is provided on the first conduit. Vacuum levels are then recorded as provided by the sensor. Recorded vacuum levels are correlated with observed conveyance of granular resin material from the supply to the receiver, with the recording being done in a computing device, preferably a microprocessor, to create an executable algorithm for optimized conveyance of the granular resin material. The algorithm is executed in the computing device to regulate the vacuum draw.

In this aspect of the invention, the computing device is desirably a microprocessor. The method yet further includes the steps of recording physical parameter data including at least one of ambient temperature, atmospheric pressure, relative humidity, and available line voltage, and using data reflecting at least one of those physical parameters in creating the executable algorithm.

The foregoing outlines rather broadly features of the invention in order that the detailed description of the invention that follows may be best understood. Additional features and advantages of the invention, as described hereinafter, may form the subject of certain of the claims of the application. It will be appreciated by those skilled in the art that the concepts and specific embodiments disclosed herein may be readily utilized as a basis for modifying or designing apparatus or other methods for carrying out the goals and results attained by this invention. It should also be realized by those skilled in the art that such equivalent implementations do not depart from the spirit and scope of the invention as set forth in the appended claims.

In reference to the drawings, where reference numbers are identical to those used in the description to designate like or similar elements throughout the various views, illustrative implementations of the invention are described. The figures are schematic and therefore not to scale. In some instances the drawings have been exaggerated and/or simplified for illustrative purposes. One of skill in the art will appreciate the many possible applications and variations of the invention that are possible based on the following description of this invention.

DETAILED DESCRIPTION OF THE INVENTION

In this application, unless otherwise apparent from the context, it is to be understood that the use of the term "vacuum" means "air at slightly below atmospheric pressure." The vacuum (meaning air slightly below atmospheric pressure) provides a suction effect that is used to draw granular plastic resin material out of a supply and to convey that granular plastic resin material through various conduits to receivers where the granular resin material can be temporarily stored before being molded or extruded. Hence, in this application it is useful for the reader mentally to equate the term "vacuum" with the term "suction".

Figure 1:
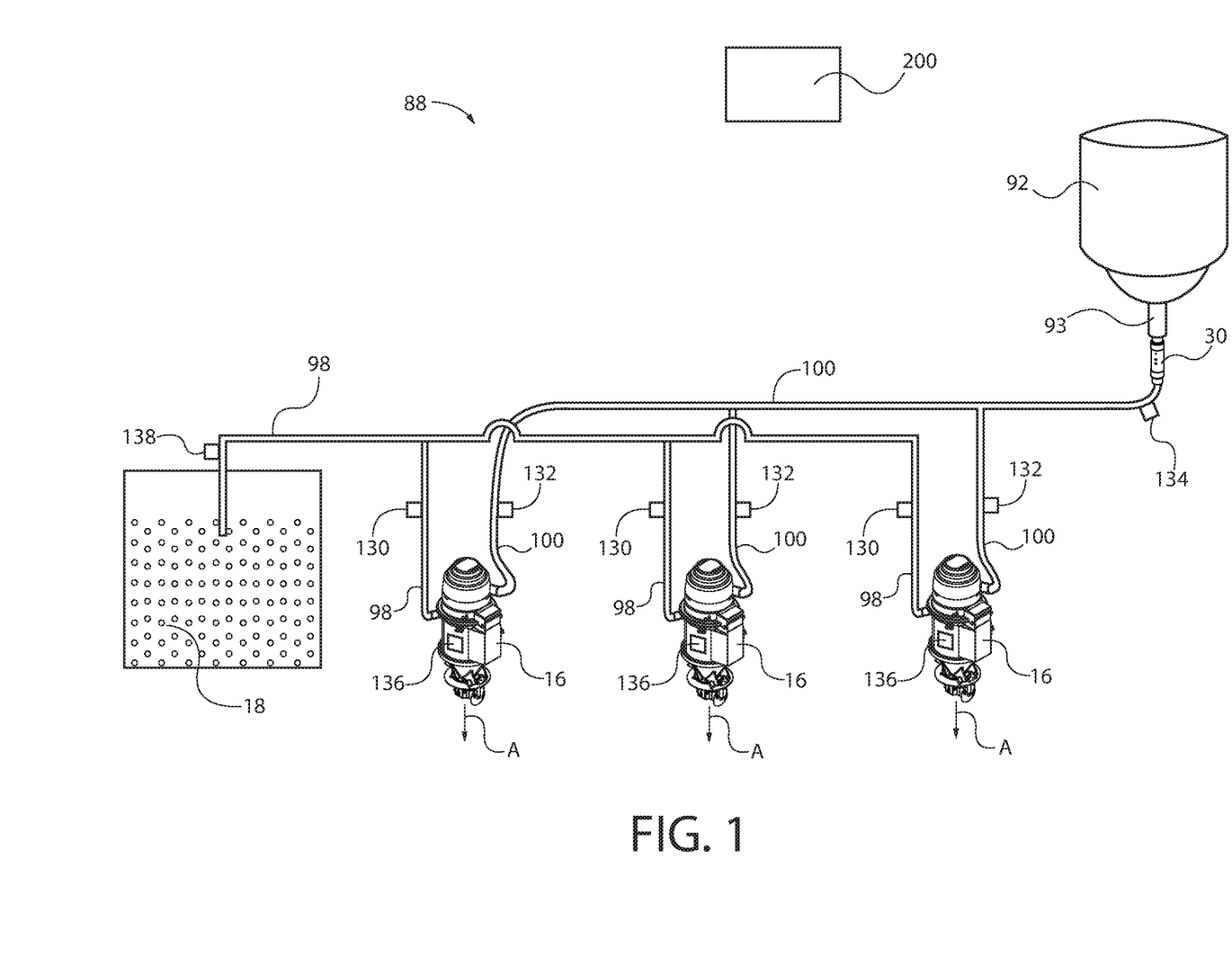
FIG. 1 is a schematic representation of a resin delivery system in accordance with aspects of the invention.

Referring to the drawings in general and to FIG. 1 in particular, apparatus for conveying granular plastic resin material from the supply to receivers that retain and dispense the resin material when needed by a process machine is illustrated in FIG. 1. The apparatus, which is designated generally 88 in FIG. 1, preferably includes a vacuum pump designated generally 92 and shown schematically in FIG. 1. Vacuum pump 92 preferably includes a vacuum pump suction head 93 also shown schematically in FIG. 1. Connected to the vacuum pump suction head 93 may be an optional airflow regulator 30 shown only in schematic form in FIG. 1. Optional airflow regulator 30 receives vacuum drawn by vacuum pump 92 through vacuum drawing conduit 100.

Figure 2:
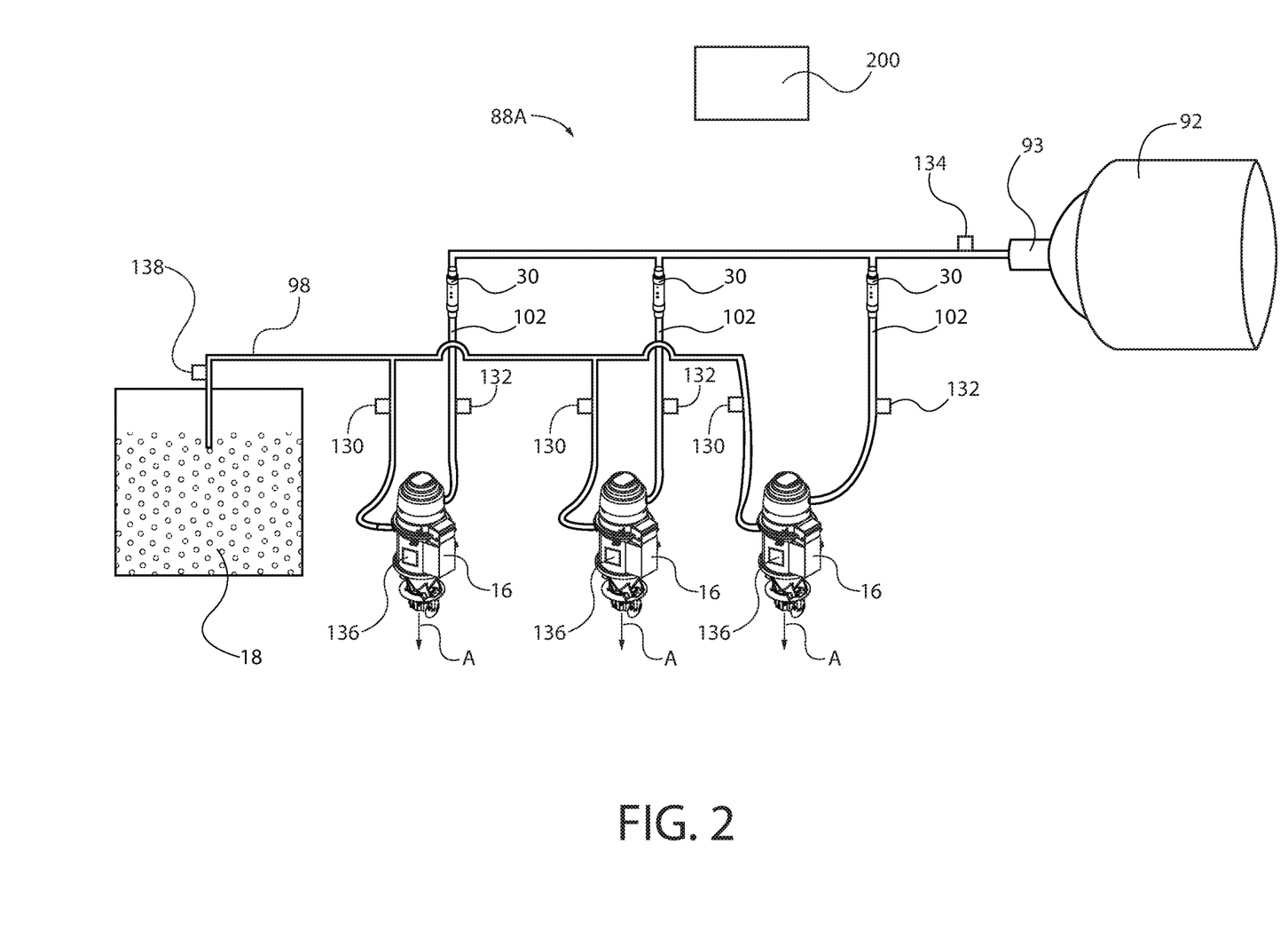
FIG. 2 is a schematic representation of an alternate embodiment of a resin delivery system in accordance with aspects of this invention.

The optional air flow regulator 30 is preferably one of the types of air flow regulators disclosed in the United States patents listed above under the heading "Cross Reference to Related Patents and Patent Applications." All of these air flow regulators, which are the preferable type of flow regulators for use in the instant invention, must be vertical or essentially vertical in order to function properly. In the drawings, all of flow regulators 30 have been illustrated in a vertical orientation. However, it is to be understood that other kinds and styles of flow regulators may be used in the course of practice of the invention.

Vacuum drawing conduit 100 is connected to a plurality of receivers 16, each of which receives, retains and dispenses, as needed, granular plastic resin material to a process machine, such as a gravimetric blender, or an extruder, or a molding press as located preferably below a receiver 16. The process machines are not illustrated in FIG. 1 to enhance the clarity of the drawing.

Further illustrated in FIG. 1 is a hopper 18 for storage of granular plastic resin material therein and a resin conveying conduit 98, which serves to draw resin from hopper 18 and to deliver the resin through resin conveying conduit 98 to the respective receivers 16 as vacuum is drawn by the vacuum pump 92, with vacuum propagating through optional air flow regulator 30, vacuum drawing conduit 100, the various receivers 16, and resin conveying conduit 98, to hopper 18. Receivers 16 are preferably of the type disclosed and claimed in U.S. Pat. No. 8,753,432.

Still referring to FIG. 1, a plurality of vacuum sensors are illustrated. Vacuum sensors 130 are provided associated with each receiver and located upstream of each receiver to sense the vacuum in resin conveying conduit 98 as that resin conveying conduit conveys resin into a receiver 16. Vacuum sensors 132 are positioned downstream of each receiver to sense vacuum at a position proximate to each receiver in vacuum drawing conduit 100. A vacuum sensor 134 is provided to sense the vacuum being drawn by vacuum pump 92 at a position proximate to vacuum pump suction head 93.

While the resin conveying system 88 illustrated in FIG. 1 has been depicted with vacuum sensors 130 upstream of each receiver, vacuum sensors 132 downstream of each receiver, and a vacuum sensor 134 at vacuum pump 92, in some implementations of the invention, only vacuum sensors upstream of receiver 16, or vacuum sensors downstream of receiver 16 may be used. Moreover, it is within the scope of the invention to provide a vacuum sensor within one or more of the receivers 16 as indicated by vacuum sensors 136 illustrated in FIG. 1. It is further within the scope of the invention to provide only a few vacuum sensors 130 or 132 or 136, located at strategic positions upstream of a receiver, downstream of a selected receiver, or within a selected receiver. Optionally but desirably a vacuum sensor 138 may also be provided at resin supply 18 to sense the level of vacuum being drawn by vacuum pump 92 through resin conveying conduit 98 proximate resin supply 18.

However many vacuum sensors are used, all of these vacuum sensors provide data, preferably wirelessly, to a controller illustrated only schematically in the drawings, which is desirably in the form of a microprocessor 200. Microprocessor 200 collects data from one or more of the sensors 130, 132, 134, 136, 138 preferably sequentially through the sensors in that only a single receiver 16 is usually active at a given time, so desirably the vacuum data relevant to a given receiver 16 is collected only when that receiver 16 is active. (Other data collection schemes, such as serial or random, and algorithmic protocols based on various physical and other parameters such as relative humidity, ambient temperature, atmospheric pressure, available line voltage for the vacuum pump, and the like, are also within the scope of this invention.) This sensed vacuum data and the other physical parameter data are preferably stored and used based preferably on an experientially developed algorithm (developed using such data) which is executed by microprocessor 200 to optimally modulate operation of vacuum pump 92. This data may desirably be correlated with time of day, the type of resin being conveyed, the temperature within the facility, and other physical parameters so as to provide a mathematical algorithm that may be used to optimize the speed of vacuum pump 92.

Alternatively to wireless communication of the vacuum sensors 130 through 138 with microprocessor 200, wiring can, of course, be used.

FIG. 2 shows an alternate embodiment of the resin conveying system of the invention where this alternate embodiment of the conveying system has been designated 88A. FIG. 2, as in FIG. 1, depicts a vacuum pump 92 shown in schematic form having a vacuum pump suction head 93 also depicted in schematic form. In the alternate embodiment of the invention illustrated in FIG. 2, vacuum drawing conduit 100 leads directly into and communicates with vacuum pump suction head 93. In the embodiment illustrated in FIG. 2, an optional air flow regulator 30 is shown as being provided for each receiver 16, with the air flow regulator 30 for a respective receiver 16 being located in a portion of a connection conduit 102 that connects a respective receiver 16 to vacuum drawing conduit 100. In FIG. 2, each air flow regulator 30 is depicted in a vertical orientation, just as is airflow regulator 30 depicted in a vertical orientation in FIG. 1. Each receiver 16 is connected by connection conduit 102 to vacuum drawing conduit 100 with optional air flow regulator 30 forming a portion of connection conduit 102. The air flow regulators 30 illustrated in FIG. 2 are desirably one of the type of air flow regulators disclosed above with reference to FIG. 1.

In FIG. 2, as in FIG. 1, a first conduit 98 serves to convey granular plastic resin from hopper 18 to the respective receivers in response to vacuum drawn by vacuum pump 92 as that vacuum propagates from vacuum pump 92 through second conduit 100, connection conduits 102, receivers 16, and resin conveying conduit 98 to hopper 18. The resin conveying system shown in FIG. 2 is similar to that shown in FIG. 1 in that it includes a variety of vacuum sensors with vacuum sensors 130 being located upstream of associated receivers 16; vacuum sensors 132 being located downstream of respective receivers 16; a vacuum sensor 134 being provided at vacuum pump 92; a plurality of vacuum sensors 136 being provided within receivers 16; and a vacuum sensor 138 desirably being provided at the resin supply to measure the vacuum drawn within resin supply conduit 98 proximate resin supply 18. As with the resin conveying system illustrated in FIG. 1, the vacuum sensors illustrated in FIG. 2 are desirably connected to a microprocessor 200, or other, more powerful computing device, wirelessly. Alternatively, the vacuum sensors can be connected by wires to microprocessor 200 or some other computing device, if necessary. The same approach to optimizing speed and modulation of the vacuum pump 92 as described above with respect to FIG. 1 is applicable to the resin conveying system illustrated in FIG. 2.

During operation of the resin conveying systems shown schematically in FIGS. 1 and 2, upon actuation of vacuum pump 92, a vacuum is drawn at vacuum pump suction head 93. This vacuum, as it propagates to hopper 18, serves to draw resin out of hopper 18 and into respective receivers 16. In the embodiment illustrated in FIG. 2, optional individual air flow regulators 30 limit the suction or vacuum drawn by vacuum pump 92 through a given associated receiver 16. In the embodiment illustrated in FIG. 1, an optional single air flow regulator 30 limits vacuum drawn through all of receivers 16 forming a portion of the granular resin conveying system illustrated in FIG. 1.

Although schematic implementations of present invention and at least some of its advantages have been described in detail hereinabove, it should be understood that various changes, substitutions and alterations may be made to the apparatus and methods disclosed herein without departing from the spirit and scope of the invention as defined by the appended claims. Moreover, the scope of this patent application is not intended to be limited to the particular implementations of apparatus and methods described in the specification, nor to any methods that may be described or inferentially understood by those skilled in the art to be present as described in this specification.

As one of skill in the art will readily appreciate from the disclosure of the invention as set forth hereinabove, apparatus, methods, and steps presently existing or later developed, which perform substantially the same function or achieve substantially the same result as the corresponding embodiments described and disclosed hereinabove, may be utilized according to the description of the invention and the claims appended hereto. Accordingly, the appended claims are intended to include within their scope such apparatus, methods, and processes that provide the same result or which are, as a matter of law, embraced by the doctrine of the equivalents respecting the claims of this application.

As respecting the claims appended hereto, the term "comprising" means "including but not limited to", whereas the term "consisting of" means "having only and no more", and the term "consisting essentially of" means "having only and no more except for minor additions which would be known to one of skill in the art as possibly needed for operation of the invention."

The following is claimed:

1. A method for conveying granular plastic resin material from a supply thereof to at least one receiver, for temporary storage of the granular plastic resin material in the receiver until the material is needed by a process machine associated with the receiver, comprising:
   a) positioning a first conduit with an open end in the supply;
   b) drawing vacuum through the first conduit, thereby conveying granular plastic resin material out of the supply and along the first conduit;
   c) providing a receiver connected with the first conduit for receipt of granular resin material from the first conduit;
   d) providing a second conduit connecting the receiver to a vacuum pump providing the drawn vacuum via the receiver to the first conduit;
   e) providing at least one vacuum sensor on the first conduit;
   f) recording vacuum levels within the first conduit as provided by the sensor;
   g) correlating recorded vacuum levels with observed conveyance of granular resin material from the supply to the receiver in a computing device to create an executable algorithm for optimized conveyance of the granular resin material; and
   h) executing the algorithm in the computing device to regulate the speed of the vacuum pump to produce a vacuum in the first conduit that optimally conveys the granular resin material from the supply to the receiver.

2. The method of claim 1 wherein the computing device is a microprocessor.

3. A method for conveying granular plastic resin material from a supply thereof to at least one receiver, for temporary storage of the granular plastic resin material in the receiver until the material is needed by a process machine associated with the receiver, comprising:
   a) positioning a first conduit with an open end in the supply;
   b) drawing vacuum through the first conduit, thereby conveying granular plastic resin material out of the supply and along the first conduit;

c) providing a receiver connected with the first conduit for receipt of granular resin material from the first conduit;
d) providing a second conduit connecting the receiver to a vacuum source providing the drawn vacuum via the receiver to the first conduit;
e) providing at least one vacuum sensor on the first conduit;
f) recording vacuum levels within the first conduit as provided by the sensor;
g) correlating recorded vacuum levels with a sensed conveyance of granular resin material from the supply to the receiver in a computing device to create an executable algorithm for optimized conveyance of the granular resin material; and
h) executing the algorithm in the computing device to regulate the speed of the vacuum pump to produce a vacuum in the first conduit that optimally conveys the granular resin material from the supply to the receiver.

4. A method for conveying granular plastic resin material from a supply thereof to at least one receiver, for temporary storage of the granular plastic resin material in the receiver until the material is needed by a process machine associated with the receiver, comprising:

a) positioning a first conduit with an open end in the supply;
b) drawing vacuum through the first conduit, thereby conveying granular plastic resin material out of the supply and along the first conduit;
c) providing a receiver connected with the first conduit for receipt of granular resin material from the first conduit;
d) providing a second conduit connecting the receiver to a vacuum source providing the drawn vacuum via the receiver to the first conduit;
e) providing at least one vacuum sensor on the first conduit;
f) recording vacuum levels within the first conduit as provided by the sensor;
g) correlating recorded vacuum levels with a conveyance of granular resin material from the supply to the receiver in a computing device to create an executable algorithm for optimized conveyance of the granular resin material; and
h) executing the algorithm in the computing device to regulate the speed of the vacuum pump to produce a vacuum in the first conduit that optimally conveys the granular resin material from the supply to the receiver.

* * * * *